United States Patent
Klemets et al.

(10) Patent No.: US 7,586,938 B2
(45) Date of Patent: Sep. 8, 2009

(54) METHODS AND SYSTEMS FOR SELF-DESCRIBING MULTICASTING OF MULTIMEDIA PRESENTATIONS

(75) Inventors: Anders E. Klemets, Redmond, WA (US); Eduardo P. Oliveira, Redmond, WA (US); James M. Alkove, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 10/693,430

(22) Filed: Oct. 24, 2003

(65) Prior Publication Data

US 2005/0089035 A1    Apr. 28, 2005

(51) Int. Cl.
  *H04J 3/16*   (2006.01)
  *G06F 15/16*  (2006.01)
  *H04N 7/173*  (2006.01)
(52) U.S. Cl. .................. 370/465; 709/231; 725/117
(58) Field of Classification Search ............... 370/465; 709/231; 725/117
  See application file for complete search history.

(56) References Cited

U.S. PATENT DOCUMENTS

| | | | |
|---|---|---|---|
| 5,634,015 A | 5/1997 | Chang et al. | |
| 5,941,951 A | 8/1999 | Day et al. | |
| 5,996,015 A | 11/1999 | Day et al. | |
| 6,029,200 A | 2/2000 | Beckerman et al. | |
| 6,189,039 B1 | 2/2001 | Harvey et al. | |
| 6,195,680 B1 | 2/2001 | Goldszmidt et al. | |
| 6,275,471 B1 | 8/2001 | Bushmitch et al. | |
| 6,279,029 B1 * | 8/2001 | Sampat et al. | 709/203 |
| 6,292,834 B1 | 9/2001 | Ravi et al. | |
| 6,317,795 B1 | 11/2001 | Malkin et al. | |
| 6,321,252 B1 | 11/2001 | Bhola et al. | |
| 6,337,881 B1 | 1/2002 | Chaddha | |
| 6,359,902 B1 | 3/2002 | Putzolu | |
| 6,442,598 B1 | 8/2002 | Wright et al. | |
| 6,564,262 B1 | 5/2003 | Chaddha | |
| 6,608,933 B1 | 8/2003 | Dowell et al. | |
| 6,845,399 B2 * | 1/2005 | Agraharam et al. | 709/231 |

(Continued)

FOREIGN PATENT DOCUMENTS

RU    2192040 C2    10/2002

OTHER PUBLICATIONS

Boavida et al, "Intenet Multimedia-Streaming Media (Tutorial)", IDMS/PROMS, 2002, LNCS 2515, pp. 365.

(Continued)

*Primary Examiner*—Hoang-Vu A Nguyen-Ba
(74) *Attorney, Agent, or Firm*—Lee & Hayes, PLLC

(57) ABSTRACT

Multimedia presentations are multicast using an announcement channel that includes presentation description information along with multiple channels for multiple streams of multimedia data to accommodate clients of different multimedia resources. Clients can use the announcement channel to select channel(s) appropriate for their multimedia resources. The channels are created in a predetermined manner (e.g., preselected logical addresses, preselected ports of an IP address, etc.) so that clients can immediately join a channel without (or concurrently with) joining the announcement channel to reduce startup latency. An acceleration channel may be created that provides blocks of data containing a preselected number of previous units, which may be transmitted at at a bit rate that is "faster than real-time". This feature allows clients with suitable resources to more quickly buffer sufficient data to begin presenting the multimedia data to users.

82 Claims, 8 Drawing Sheets

U.S. PATENT DOCUMENTS

| | | | |
|---|---|---|---|
| 7,310,334 | B1 | 12/2007 | FitzGerald et al. |
| 2002/0057333 | A1 | 5/2002 | Mayuzumi |
| 2003/0065917 | A1 | 4/2003 | Medvinsky et al. |
| 2003/0221099 | A1 | 11/2003 | Medvinsky et al. |
| 2003/0236912 | A1 | 12/2003 | Klemets et al. |
| 2004/0128342 | A1* | 7/2004 | Maes et al. .................. 709/200 |
| 2007/0110074 | A1 | 5/2007 | Bradley et al. |
| 2007/0124472 | A1 | 5/2007 | Requena |
| 2007/0186002 | A1* | 8/2007 | Campbell et al. ........... 709/231 |
| 2008/0002709 | A1 | 1/2008 | Kennedy et al. |

OTHER PUBLICATIONS

Deutsch, "ZLIB Compressed Data Format Specification version 3.3", RFC 1950, May 1996, pp. 11.

Dutta et al, "MarconiNet: Overlay Mobile Content Distribution Network", IEEE Communications Magazine, Feb. 2004, vol. 42, No. 2, pp. 64-75.

Fasanoet al, "Multicast session control center (MSCC)", CSELT Technical Report, vol. 28, No. 3, Jun. 2000, pp. 405-419.

Handley et al, "SDP:Session Description Protocol", RFC 2327, Apr. 1998, pp. 42.

Handley et al, "Session Announcement Protocol", Ref 2974, Oct. 2000, pp. 18.

Schulzrinne et al, "RTP:A Transport Protocol for Real-Time Application", RFC 3550, Jul. 2003, pp. 104.

Shin et al, "The RTMW application: bringing multicast audio/video to the web", Computer Networks and Isdn System, Apr. 1998, vol. 30, No. 1-7, pp. 685-687.

Tasaka et al, "A performance comparison of single-stream and multi-stream approaches to live media synchronization", IEICE Transactions on Communications, vol. E81-B, No. 11, Nov. 1998, pp. 1988-1997.

Tasaka et al, "Single-stream versus Multi-Stream for Live Media Synchronization", IEEE, 1998, vol. 1, pp. 470-476.

Chung-Ming Huang and Hsu-Yang Kung, "Mcast: a Multicast Multimedia Communication Software Development Platform", IDMS 2000, LNCS 1905, pp. 53-64, 2000.

Joseph C. Pasquale et al., "The Multimedia Multicast Channel", Internetworking: Research and Experience, vol. 5, pp. 151-162, 1994.

C.-M. Huang and H. -Y. Kung, "Developing Multicast, Multiple-stream, Multimedia Presentations Using a Formal Approach", IEEE Proceedings, pp. 245-276, Dec. 1999.

Albert Banchs, et al., "Multicasting Multimedia Streams with Active Networks", IEEE, pp. 150-159, 1998.

Stuart Clayman, et al., "The Interworking of Internet and ISDN Networks for Multimedia Conferencing", Information Services & Use, vol. 15, pp. 75-101, 1995.

Hideki Yamamoto, "Multimedia Streaming Technology in Broadband Networks 3- Digital Rights Management System", OKI Technical Review, vol. 69, No. 4, Issue 192, Oct. 2002.

V. Thomas, "White Paper: IP Multicast in RealSystem G2", RealNetworks, Inc., pp. 1-14, Jan. 1998.

Christopher R. Hertel, "Understanding the Network Neighborhood—How Linux Works with Microsoft Networking Protocols", Linux Magazine, pp. 1-13, May 2001.

IP Multicast: Interactive Multimedia on the Internet, Belnet-Techinical-IP Multicast, http://www.belnet.be/technical/pages/multicast/multicast_techinical2.html/, pp. 1-9, 1999.

Decision on Grant Patent for Invention from the Russian Federal Service for Intellectual Property, Patent Application No. 20051200669 mailed on May 12, 2009.

* cited by examiner

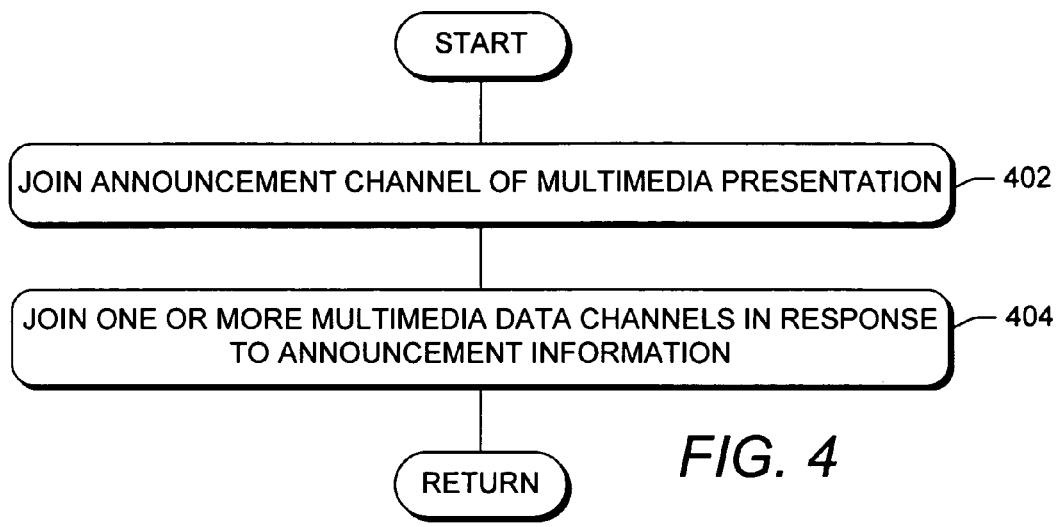
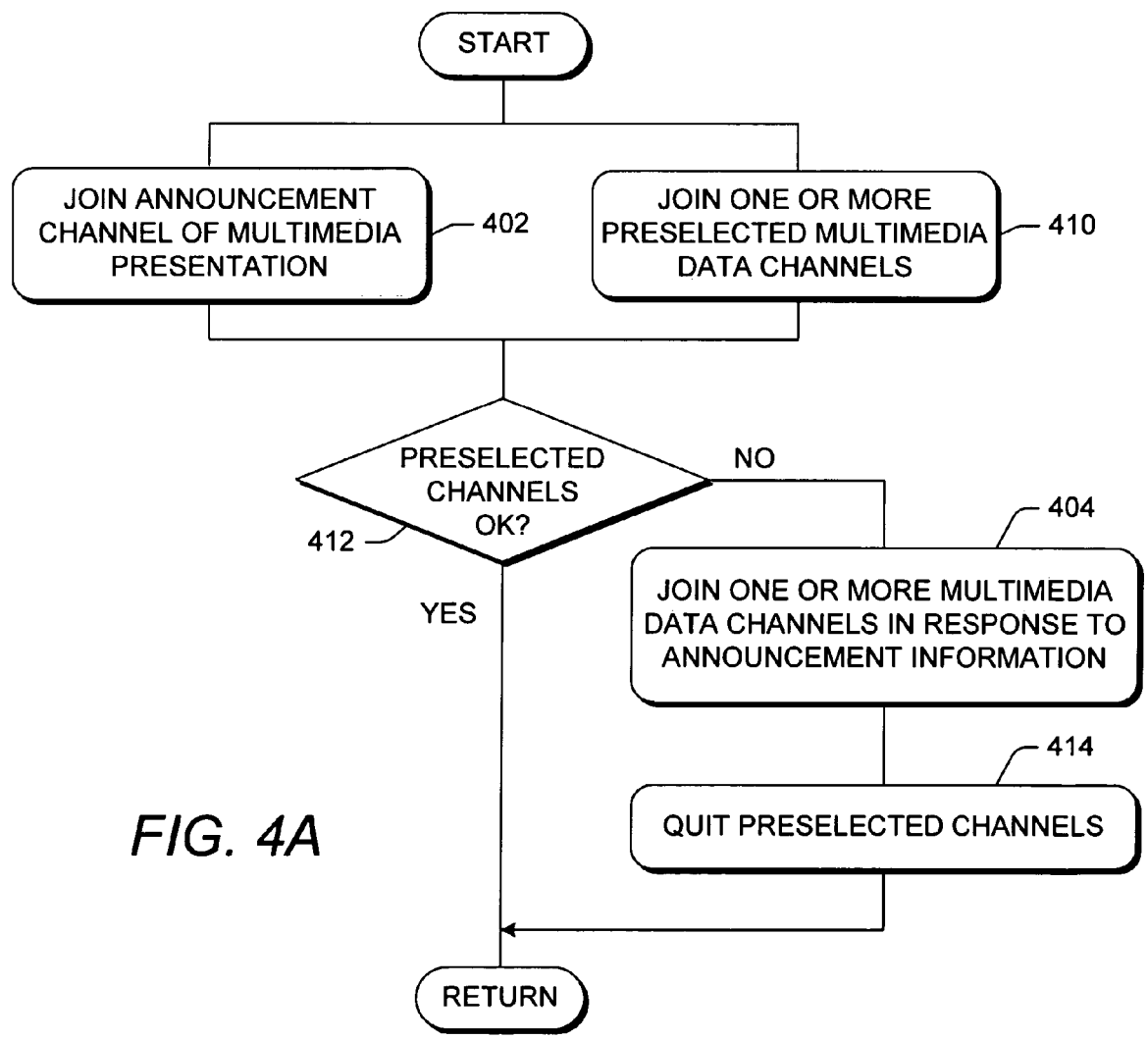

METHODS AND SYSTEMS FOR SELF-DESCRIBING MULTICASTING OF MULTIMEDIA PRESENTATIONS

FIELD

Various embodiments described below relate generally to multicasting and, more particularly but not exclusively to, methods and systems for multicasting multimedia presentations.

BACKGROUND

Conventional approaches to multicasting of streaming content typically involves providing content to be multicast to a server, which then multicasts the content over a network (i.e., without feedback from the clients receiving the streams). The server typically multicasts the content in several streams having different formats (e.g., bit rates, languages, encoding schemes etc.) Clients attached to the network can then receive the stream(s) appropriate for its resources. To allow clients to select which stream(s) to receive, one multicast approach requires that the server provide a file that provides "multicast information" that allows clients to open streams of content. Maintaining and publishing this file is typically a manual process that has a relatively high administrative cost. Further, if not properly maintained and published, clients may encounter problems, which can lead to customer dissatisfaction. Another problem with this approach is that clients must keep their "multicast information" up-to-date so that they can properly access the content. This problem is exacerbated for clients that do not have a suitable back channel to request updates (e.g., clients with unidirectional satellite links).

SUMMARY

In accordance with aspects of the various described embodiments, methods and systems to multicast multimedia presentations are provided. In one aspect, multimedia presentations are multicast using an announcement channel that includes presentation description information along with multiple channels for multiple streams of multimedia data to accommodate clients of different multimedia resources. Clients can use the announcement channel to select channel(s) appropriate for their multimedia resources.

In another aspect, the channels are created in a predetermined manner (e.g., preselected logical addresses, preselected ports of an IP address, etc.) so that clients can immediately join a channel without (or concurrently with) joining the announcement channel to reduce startup latency.

In another aspect, an acceleration channel may be created that provides blocks of data containing the current unit of the multimedia presentation along with a preselected number of previous units at a bit rate that is "faster than real-time" (i.e., at a rate that is faster than the bit-rate of the multimedia streams). This feature allows clients with suitable resources to more quickly buffer sufficient data to begin presenting the multimedia data to users. Alternatively, the acceleration channel need not be "faster than real time" so that a client may concurrently join both the acceleration channel and another channel that multicasts multimedia data so that, in effect, the client receives the multimedia data at a rate that is "faster than real-time."

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 is a flow diagram illustrating client operational flow in the system of FIG. 1, according to one embodiment.

FIG. 4A is a flow diagram illustrating client operational flow in the system of FIG. 1, according to another embodiment.

DETAILED DESCRIPTION

Figure 1:
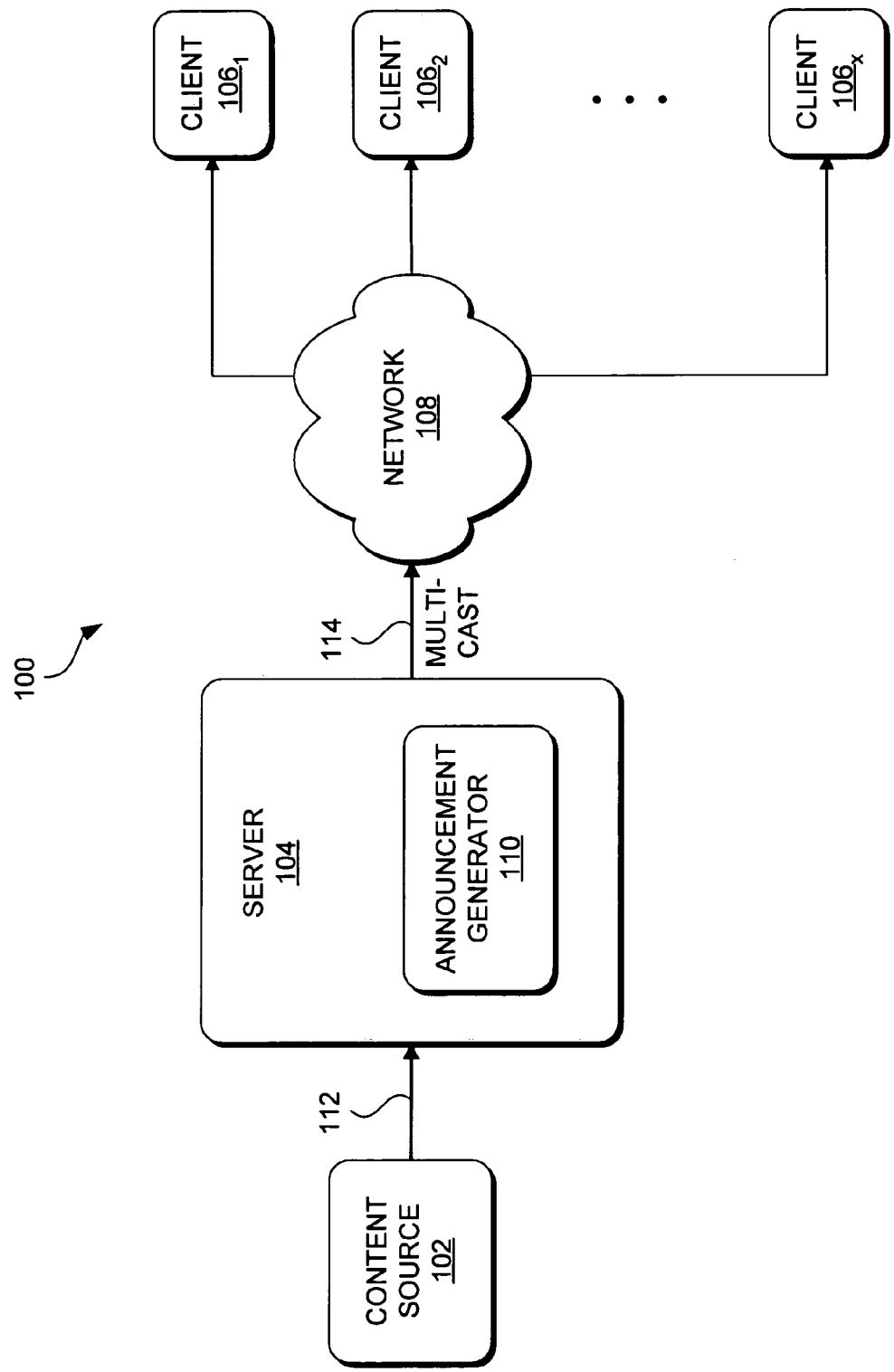
FIG. 1 is a block diagram illustrating a system for multicasting multimedia presentations, according to one embodiment.

FIG. 1 illustrates a system 100 for multicasting multimedia presentations, according to one embodiment. In this embodiment, system 100 includes a content source 102, a server 104, and clients $106_1$-$106_X$ that are connected to server 104 via a network 108. Network 108 can be any suitable type of wired (including optical fiber) or wireless network (e.g., RF or free space optical). In one embodiment, network 108 is the Internet, but in other embodiments network 108 can be a local area network (LAN), a campus area network, etc.

In this embodiment, server 104 includes an announcement generator 110. As will be described in more detail below, embodiments of announcement generator 110 generate streams containing information regarding multimedia presentations to be multicast over network 108. The operation of this embodiment of system 100 in multicasting multimedia presentations is described below in conjunction with FIG. 2 through FIG. 4.

Figure 2:
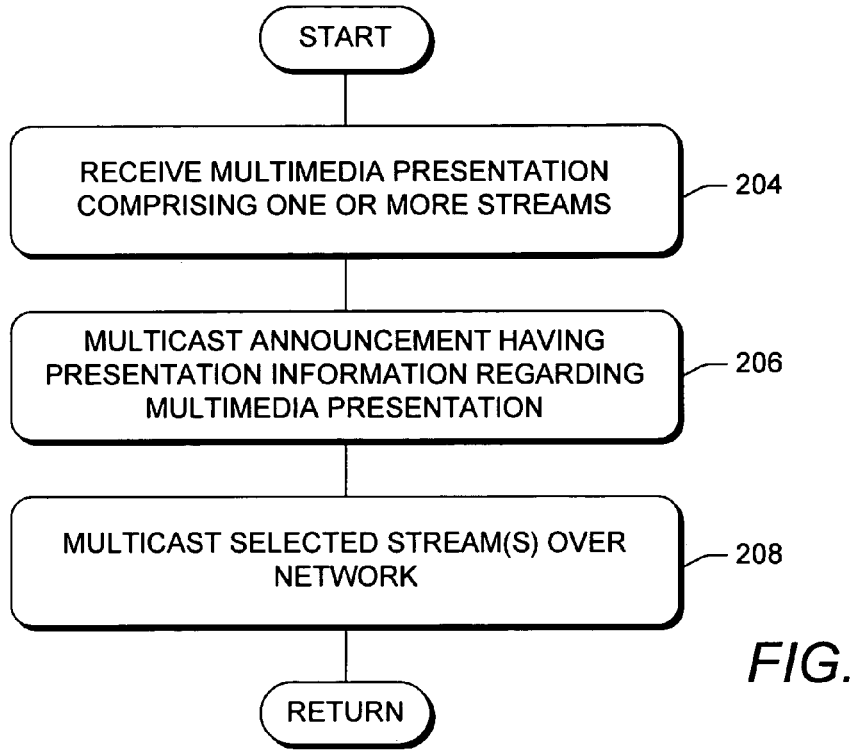
FIG. 2 is a flow diagram illustrating server operational flow in the system of FIG. 1, according to one embodiment.

FIG. 2 illustrates server operational flow of system 100 of FIG. 1 in multicasting a multimedia presentation, according to one embodiment. Referring to FIGS. 1 and 2, server 104 operates as follows to multicast a multimedia presentation.

In a block 204, server 104 receives a multimedia presentation via a connection 112. In this embodiment, server 104 receives the multimedia presentation from content source 102 via a link 112. In particular, content source 102 provides multimedia content to be multicast over network 108. The multimedia content can be generated in any suitable manner. For example, the multimedia content may be previously recorded/generated content that is then stored in a datastore (not shown), or a live performance that is captured (e.g., using a video camera, microphone, etc.) and encoded (encoder not shown).

In a typical application, the multimedia presentation will include multiple streams. For example, the multimedia presentation may include a video stream, an audio stream, another video stream encoded at a lower bit rate and another audio streams encoded at a lower bit rate. In other applications, the multimedia presentation may have more or fewer streams than those described in this example application. Thus, in this embodiment, server 104 receives the multimedia presentation in the form of one or more streams in block 204.

In a block 206, server 104 forms an announcement stream and multicasts the announcement stream over network 108 via a link 114. In this embodiment, announcement generator 110 of server 104 forms the announcement stream. In some embodiments, announcement generator 110 may be configured by an administrator, while in other embodiments announcement generator 110 may be configured to process stream(s) received in block 204 and extract information from the stream(s) to form the announcement stream In some embodiments, server 104 multicasts the announcement stream on a dedicated announcement channel (i.e., a channel without announcement information related to other multimedia presentations). As used in this context, a channel can be a logical address such as a multicast Internet protocol (IP) address and port. Thus, a client can join a channel by listening to the logical address and port associated with the channel. Clients may learn of the logical address in any suitable manner such as but not limited to email, invitations, website postings, and conventional Session Announcement Protocol (SAP) multicasts (e.g., as defined in Specification, IETF RFC-2974, entitled "Session Announcement Protocol". In embodiments using SAP multicasts to announce a multimedia presentation, the SAP multicast need not include the detailed presentation description information that would be provided in an "in-line" announcement stream (described in more detail below).

In some embodiments, the announcement stream is multicast "in-line" with a stream containing multimedia data. For example, the stream of multimedia data can be multicast using packets according to the Real-time Transport Protocol (RTP) and the announcement stream can be multicast using packets according to the Real-time Transport Control Protocol (RTCP). In one embodiment, the RTP is defined in Request For Comments (RFC) 3550, Internet Engineering Task Force (IETF), July, 2003 (which includes the specification of the RTCP as well). In this embodiment, the RTP is extended to support announcement data in RTCP packets. In a further refinement, the announcement data can be sent "in-line" in the same RTP packets (or other protocol packets/datagrams) as the multimedia data. In other embodiments, the announcement channel can be out-of-band (e.g., when the announcement channel is multicast using SAP.

The announcement stream contains information that describes the multimedia presentation such as, for example, identification of various channels used to multicast the multimedia presentation, descriptions of the stream (e.g., indicating the type of stream (e.g., video or audio); bit-rate of the stream; language used in the stream, etc.) being transported by each of the channels, error correction information; security/authentication information; encryption information; digital rights management (DRM) information, etc. In one embodiment, the announcement stream is repeatedly multicast during the multimedia presentation so that clients joining at different times may receive the multimedia presentation description information. A client receiving this presentation description information via the announcement stream can then determine which channel(s) are suitable to join based in view of its resources.

In a block 208, server 104 multicasts stream(s) selected from the stream(s) of the multimedia presentation received in block 204. In some scenarios, server 104 multicasts all of the streams received in block 204. In some embodiments, an administrator can configure server 104 to multicast particular streams in preselected channels. In one embodiment, server 104 supports at least an announcement channel, a video channel and an audio channel. More typically, server 104 will also support additional channels of video and audio streams of different bit rates to accommodate clients having different resources available to process the multimedia presentation.

Figure 3:
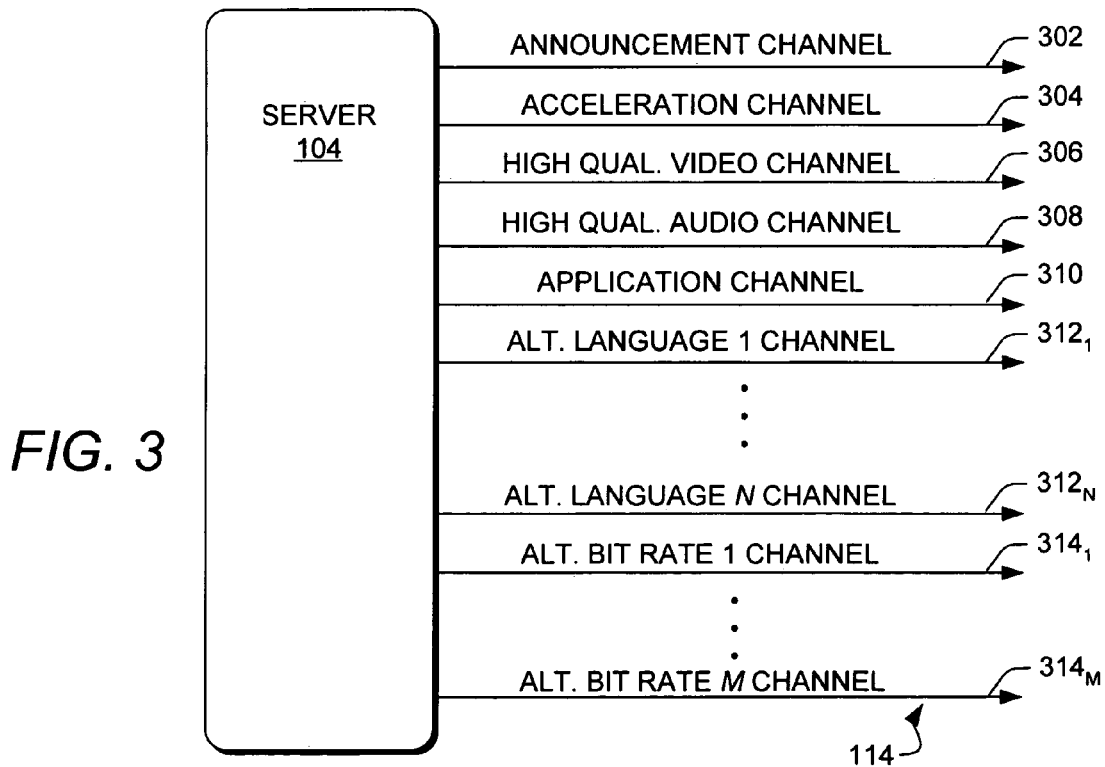
FIG. 3 is a diagram illustrating exemplary channels, according to one embodiment.

For example, as shown in FIG. 3, server 104 may be configured to support an announcement channel 302, an acceleration channel 304 (described below in conjunction with FIGS. 7 and 8), a high quality video channel 306, a high quality audio channel 308, an application channel 310, alternative language channels $312_1$-$312_N$, and alternative bit rate channels $314_1$-$314_M$ (for audio and/or video streams). In one embodiment, application channel 310 can be used to multicast data used by applications expected to be running locally on the clients (e.g., a media player, or other applications that may require a plug-in to use the multicasted application data such as Microsoft PowerPoint® data). Depending on the streams provided by content source 102 and the configuration of server 104, and the preselected definition of the channels, server 104 may map a stream into only one channel, multiple channels or no channels. For example, if multimedia presentation from content source 102 includes an English language stream and a Spanish language stream, server 104 may be configured to map the Spanish language stream into all of channels $312_1$-$312_N$, or only channel $312_1$, or to no channel at all.

In some embodiments, the "layout" of the channels is preselected. For example, in embodiments in which each channel has its own IP address, the channels may be a set of sequential IP addresses in the range of IP addresses assigned for multicasting (i.e., the range of IP address 224.0.0.0 to IP address 239.255.255.255). Thus, announcement channel 302 may be assigned to IP address 231.0.0.1, acceleration channel 304 may be assigned to IP address 231.0.0.2, and high quality video channel 306 may be assigned to IP address 231.0.0.3, and so on. Similarly, the channels may be a set of sequential ports of a group IP address. Thus, in an RTP-based embodiment, announcement channel 302 may be assigned to port 231.0.0.1:5000, acceleration channel 304 may be assigned to port 231.0.0.1:5002, high quality video channel 306 may be assigned to port 231.0.0.1:5004, and so on (so that ports 5001, 5003 and 5005 can be used for the RTCP packets).

The approaches used by the above embodiments of system 100 have several advantages. For example, because the announcement stream is multicast on a dedicated channel, a client can more quickly obtain the presentation description information, thereby advantageously reducing start up latency. In contrast, a conventional SAP multicast approach typically has a larger start up latency because SAP multicasts generally announce a large number of multicasts, which tends to reduce the frequency at which announcements for a particular multimedia presentation is multicast (which in turn tends to increase start up latency).

Further, these embodiments of system 100 do not require that clients have a back channel to server 104, thereby providing more flexibility in delivering multimedia presentations to a desired audience.

In addition, these embodiments of system 100 eliminates the need for the server to provide a "multicast information" file required in the previously-described conventional system, and, thus, the costs involved in maintaining and publishing this file.

Still further, because the streams being multicast in the set of channels are "predictable" in some embodiments, clients may choose to join particular channels without waiting to receive and process the multimedia presentation description information from announcement channel 302. For example, an aggressive client (typically a client with relatively large resources) may choose to join high quality video and high quality audio channels 306 and 308 concurrently with or instead of joining announcement channel 302, thereby reducing start up latency if the client indeed has sufficient resources to process the streams without losing data. For example, a client with large resources can be a client having a computing platform with high speed CPU and large buffering resources, and is connected to a high-speed computer network with a relatively large amount of available bandwidth. The high speed CPU and large buffering resources significantly reduce the risk of losing data.

FIG. 4 illustrates operational flow of client 106 (FIG. 1) in receiving a multimedia presentation that is being multicast by server 104 (FIG. 1), according to one embodiment. Clients $106_2$-$106_X$ (FIG. 1) can operate in a substantially identical manner. Referring to FIGS. 1, 3 and 4, client 106, operates as follows in receiving the multimedia presentation.

In a block 402, client $106_1$, having already received the logical address of the announcement channel of a multimedia presentation, joins announcement channel 302. As previously described for one embodiment, server 104 repeatedly multicasts presentation description information on a dedicated announcement channel. Thus, client $106_1$ can relatively quickly receive the presentation description information compared to conventional systems that generally multicast description information of a relatively large number of multimedia and/or other types of presentations.

In a block 404, client 106, then joins one or more of the channels that provide multimedia data streams, which are described in the received announcement stream. In one embodiment, client $106_1$ can determine which channel(s) to join to have an optimal experience using the resources available to client $106_1$. Client $106_1$ then can receive the selected stream(s) of the multimedia presentation.

FIG. 4A illustrates operational flow of client $106_1$ (FIG. 1) in receiving a multimedia presentation that is being multicast by server 104 (FIG. 1), according to another embodiment. Clients $106_2$-$106_X$ (FIG. 1) can operate in a substantially identical manner. Referring to FIGS. 1, 3 and 4A, client 106, operates as follows in receiving the multimedia presentation. In this embodiment, client $106_1$ substantially concurrently performs block 402 (to join announcement channel 302 as described above) and a block 410.

In block 410, client $106_1$, also joins one or more preselected channels of the multimedia presentation in addition to announcement channel 302. As previously described for one embodiment, server 104 can be configured to multicast streams in preselected channels in a predetermined manner. In this embodiment, client $106_1$ can take advantage of the preselected channel assignments to join desired channels without having to receive the presentation description information from announcement channel 302. For example, in one scenario, client $106_1$ has relatively large resources to receive and process multimedia presentations, capable of handling typical high quality video and high quality audio streams. With these resources, client $106_1$ can be configured to immediately join channels 306 and 308 to receive high quality video and high quality audio streams to reduce start up latency with a relatively high expectation that client $106_1$ can properly process the streams.

In a decision block 412, client $106_1$ determines whether it can optimally process the stream(s) received from the channel(s) it joined in block 410 in view of the resources available to client $106_1$. In one embodiment, client $106_1$ uses the presentation description information received from announcement channel 302 to determine whether its resources can handle the streams received on these channels. For example, the streams of channels joined in block 410 may have bit rates (which will be described in the announcement stream) that are too great for client $106_1$ to process without losing data (which can result in choppy audio playback for audio streams or blocky video playback for video streams). If client $106_1$ determines in block 412 that it can optimally process the stream(s) of the preselected channel(s), client $106_1$ continues to receive the stream(s) from the channel(s) client $106_1$ joined in block 410 until the multicasted multimedia presentation terminates.

However, in this embodiment, if client $106_1$ in block 412 determines that it cannot optimally process the stream(s) of the preselected channel(s), the operational flow proceeds to block 404 (previously described in conjunction with FIG. 4). In block 404, using the presentation description information received in block 402, client $106_1$ join one or more other channels that carry multimedia data streams that client $106_1$ can optimally process. In a block 414, in this embodiment client $106_1$ may quit the preselected channels joined in block 410. Client $106_1$ continues to receive the stream(s) from the channels joined in block 404 until the multicasted multimedia presentation terminates or chooses to leave the channel.

Figure 5:
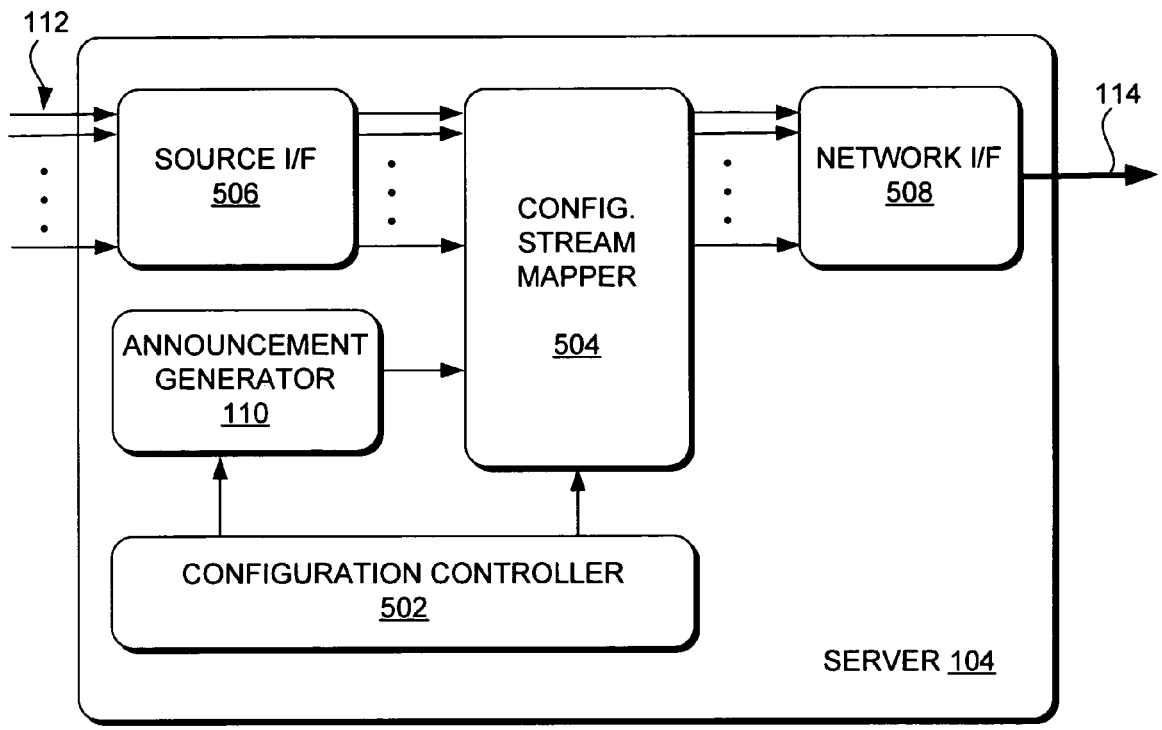
FIG. 5 is a block diagram illustrating the server of FIG. 1, according to one embodiment.

FIG. 5 illustrates some of the components of server 104 (FIG. 1), according to one embodiment. In this embodiment, in addition to announcement generator 110 (described above in conjunction with FIG. 1), serving 104 includes a configuration controller 502, a configurable stream mapper 504, a source interface 506 and a network interface 508. In some embodiments, these elements are software modules or components that can be executed by a computing environment of server 104.

Source interface 506 is configured to receive one or more multimedia streams from content source 102 (FIG. 1) via link 112. Configurable stream mapper 504 is configured to receive the streams from source interface 506, an announcement stream from announcement generator 110, and control information from configuration controller 502. In this embodiment, configurable stream mapper 504 functions like a switch in mapping or directing one or more of the streams received from source interface 506 to multicast channel(s). Network interface 508 multicasts the selected streams over network 108 (FIG. 1). In some embodiments, configuration controller 502 configures configurable stream mapper 504 to map the received stream(s) of the multimedia presentation into channel(s). In addition, in some embodiments configuration controller 502 directs announcement generator 110 in generating announcements. Operational flow of one embodiment of configuration controller 502 is described below in conjunction with FIGS. 5 and 6.

Figure 6:
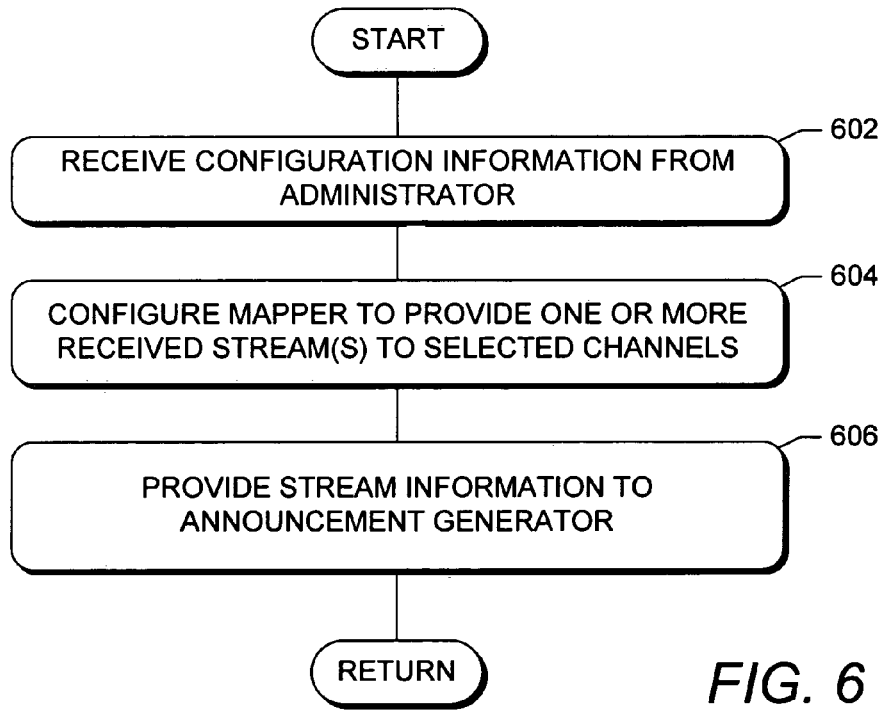
FIG. 6 is a flow diagram illustrating operational flow of the configuration controller of FIG. 5, according to one embodiment.

FIG. 6 illustrates operational flow of configuration controller 502 (FIG. 5) in multicasting a multimedia presentation, according to one embodiment. Referring to FIGS. 5 and 6, one embodiment of configuration controller 502 operates to multicast a multimedia presentation as described below.

In a block 602, this embodiment of configuration controller 502 receives configuration information from an administrator. The administrator can manually provide configuration information to configuration controller 502 of server 104. This configuration information may define each of the channels in terms of logical address, and include presentation description information (previously described). For example, the presentation information may include the media type(s) of the stream(s) of the multimedia presentation to be multicast, the bit-rate(s) of the stream(s); the language(s), error correction information; security/authentication information; encryption information; digital rights management (DRM) information, etc.

In alternative embodiments, configuration controller 506 may be configured to extract the presentation description information from the streams themselves (e.g., from header or metadata information included in the streams) after being received from content source 102 (FIG. 1) via source interface 506.

In a block 604, configuration controller 502 configures stream mapper 504 to map the announcement stream from announcement generator 110 and the multimedia data stream(s) from source interface 506 to the channels as described in the presentation description information. This announcement stream is repetitively multicast over the announcement channel by server 104 during the multicast of the multimedia presentation.

In a block 606, configuration controller 502 provides presentation description information for the stream(s) to announcement generator 110. As previously described, announcement generator 110 forms the announcement stream that includes the presentation description information.

As previously described, the "layout" of the channels may be preselected. For example, a client would be given a logical address (e.g., a URL) for joining a multicast multimedia presentation. In one embodiment, that first logical address is preselected to carry the announcement stream in one embodiment. In this example, the next sequential logical address is preselected to carry the acceleration channel, while the next sequential logical address is preselected to carry a high quality video stream, and so on as shown in the embodiment of FIG. 3. Configuration controller 502 configures stream mapper 504 to map the announcement stream and the multimedia data streams according to the preselected channel layout.

Figure 7:
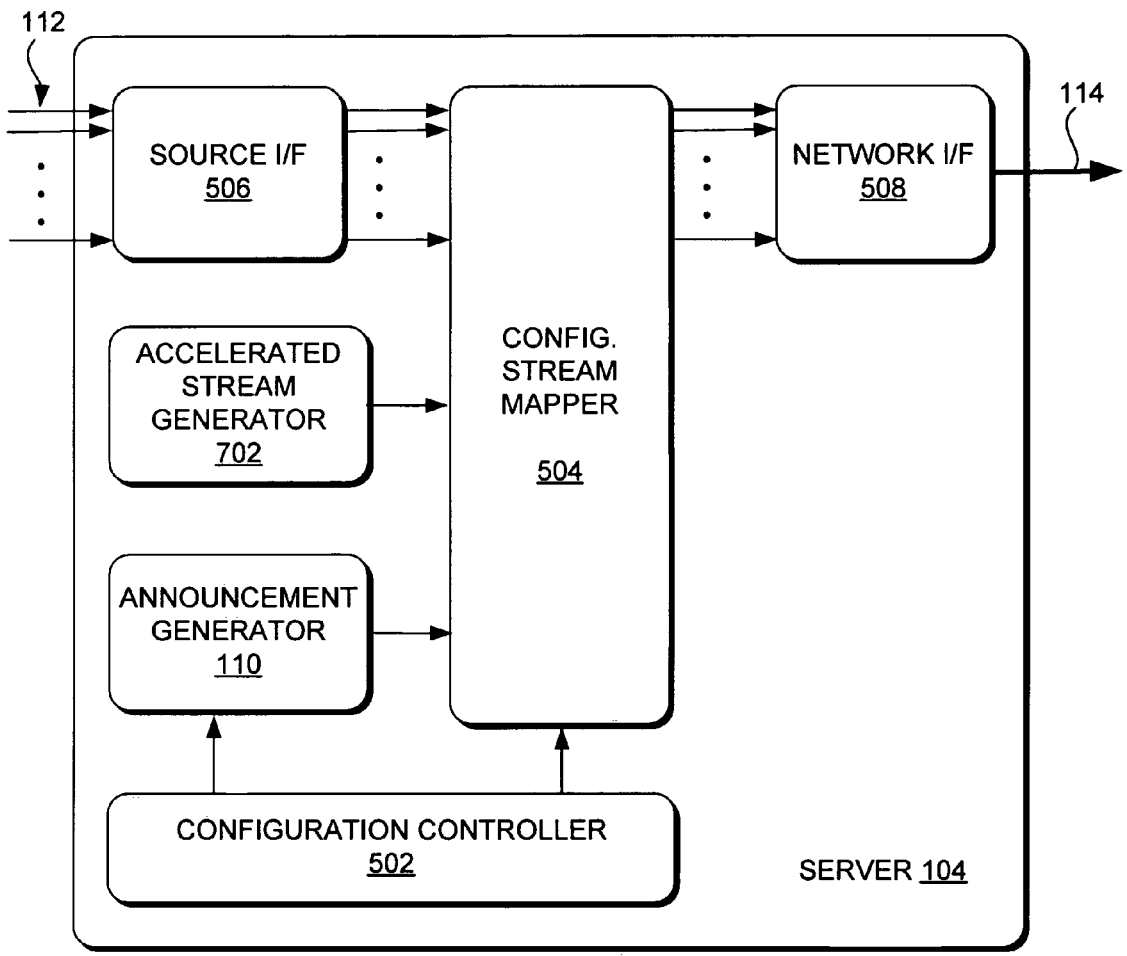
FIG. 7 is a block diagram illustrating the server of FIG. 1, according to another embodiment.

FIG. 7 illustrates some of the components of server 104 (FIG. 1), according to another embodiment. This alternative embodiment of server 104 is substantially similar to the embodiment of FIG. 5, except that this embodiment includes an accelerated stream generator 702. In one embodiment, accelerated stream generator 702 is configured to form a stream in which each unit of multimedia data that is multicast contains a current subunit of multimedia data and a preselected number of previous subunits of data. For example, an accelerated stream may be multicast so that a datagram contains the current frame(s) of the multimedia presentation and the frames of the previous five seconds. In this embodiment, accelerated stream generator 702 provides the accelerated stream to configurable stream mapper 504 to be mapped into a dedicated acceleration channel such as acceleration channel 304 (FIG. 3). However, in other embodiments, an acceleration channel datagram need not include the current frame(s).

Figure 8:
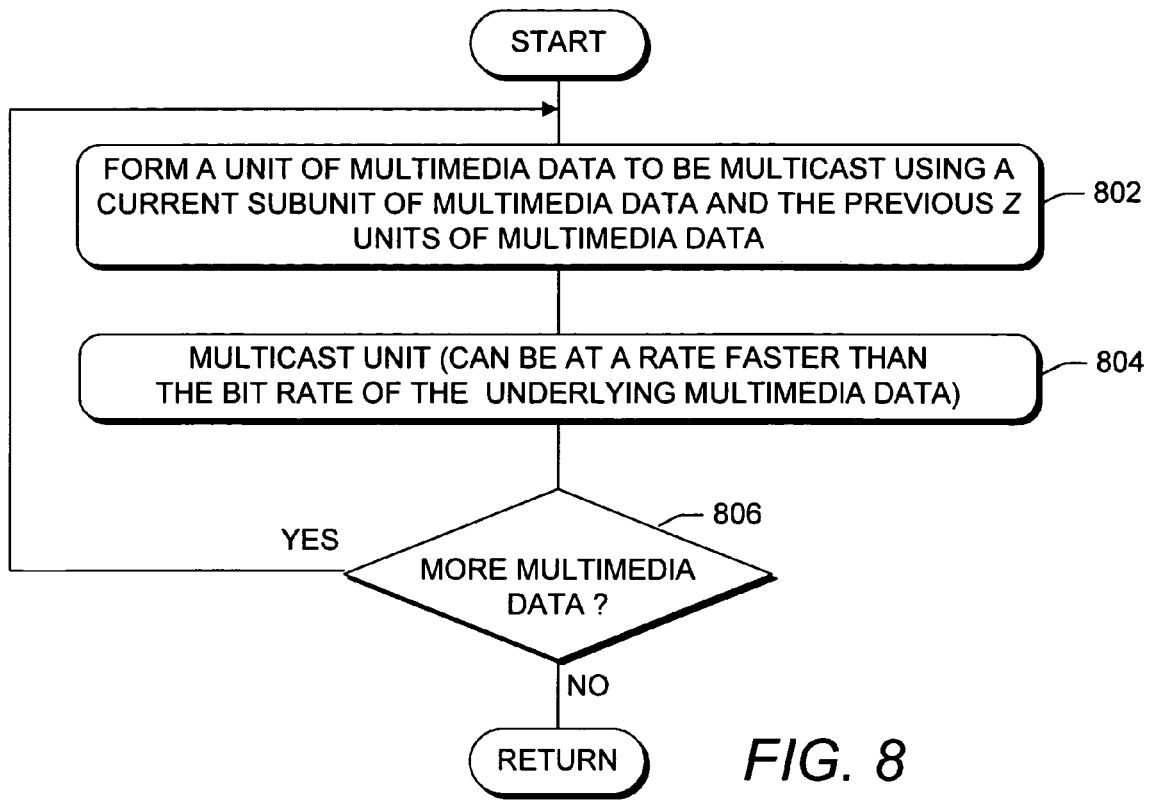
FIG. 8 is a flow diagram illustrating operational flow of the server with an accelerated stream generator of FIG. 7, according to one embodiment.

FIG. 8 illustrates operational flow of server 104 with accelerated stream generator 702 (FIG. 7), according to one embodiment. Referring to FIGS. 7 and 8, this embodiment of server 104 operates as described below.

In a block 802, accelerated stream generator 702 forms a unit of multimedia data for multicast over network 108 (FIG. 1). In this embodiment, accelerated stream generator 702 forms the unit using a current subunit of the multimedia presentation data and the previous Z subunits of multimedia presentation data. As previously mentioned, the unit may be a datagram or packet, and the subunits may be frames of multimedia data. In one embodiment, Z is selected to ensure that the unit (i.e., packet or datagram) will contain a key frame needed to render or decode the multimedia data. In other embodiments, Z is selected without regard to whether the unit will be ensured of having a key frame.

In a block 804, the unit of multimedia data formed in block 802 is multicast over network 108 (FIG. 1). In this embodiment, accelerated stream generator 702 provides the unit of multimedia data to configurable stream mapper 504, which then maps the block to the acceleration channel. Server 104 then multicasts the unit of multimedia data over network 108 (FIG. 1) via network interface 508. In one embodiment, server 104 multicasts the unit at a rate that is "faster than real time" (i.e., at a bit rate that is faster than the bit rate of the underlying multimedia data). This approach advantageously allows a client having relatively large resources to join the acceleration channel and quickly fill the buffer of its multimedia player in receiving the unit so that rendering or playback can begin more quickly. This feature is enhanced in embodiments in which the multicasted unit of multimedia data includes a key frame. Alternatively, the rate at which server 104 multicasts the unit need not be "faster than real time". This approach may be used in applications in which the client concurrently joins both the acceleration channel and another channel that multicasts multimedia data so that, in effect, the client receives the multimedia data at a rate that is "faster than real-time."

If more multimedia data is to be multicasted, the operational flow returns to block 802, as represented in decision block 806. Thus, for example, using the above example of multimedia frames transported in datagrams, the next datagram would include the next frame of multimedia data, plus the frame added in the previous datagram, plus the previous (Z−1) frames. Thus, in this embodiment, each unit (e.g., datagram) represents a sliding window of the current subunit (e.g., frame) and the previous Z frames, with Z selected to be large enough to ensure that each unit has enough information to minimize the time needed to allow the client's multimedia player to start rendering/playback of the multimedia presentation. As previously mentioned, in some embodiments Z may be selected to ensure that each unit has a key frame.

In one embodiment, units of video and audio data are multicasted in an alternating manner on the same channel if the multimedia presentation includes both audio and video streams. In other embodiments, separate acceleration channels may be used for audio and video streams.

At the start of a multimedia presentation, one embodiment of accelerated stream generator waits until at least Z subunits of multimedia data have been multicasted in the non-accelerated channel(s) before forming a unit of data in block 802.

Figure 9:
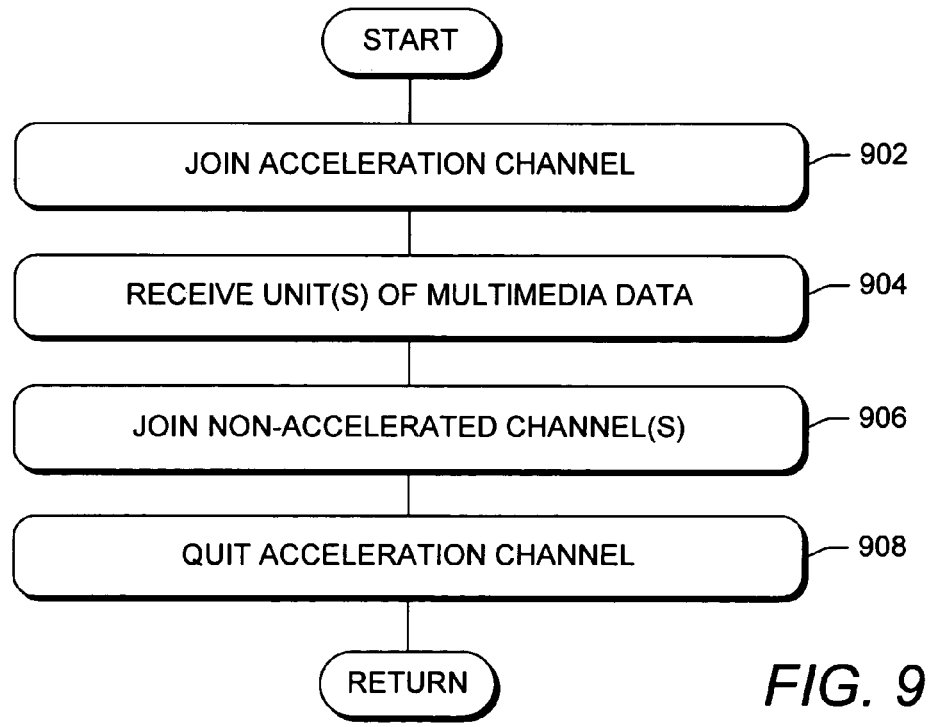
FIG. 9 is a flow diagram illustrating client operational flow in receiving an accelerated stream, according to one embodiment.

FIG. 9 illustrates client operational flow in receiving an accelerated stream, according to one embodiment. In a block 902, a client (e.g., one of clients $106_1$-$106_X$ of FIG. 1) joins the acceleration channel. In some scenarios, the acceleration channel is part of the preselected channel layout and the client can join it either concurrently or without joining the announcement channel. As previously described, the acceleration channel can be advantageously used by a client having relatively large resources for receiving and processing multimedia presentations so that the client may reduce start up latency.

In a block 904, the client receives one or more units of multimedia data from the acceleration channel. In one embodiment, each unit of multimedia data is generated as described above in conjunction with FIG. 8. The client can then process each unit of multimedia data to relatively quickly begin the rendering or playback process. In one scenario, the client receives a unit of video data and a unit of audio data, with the video data containing a key frame so that the client can begin the rendering/playback process as soon as possible. As previously described, a unit need not have a key frame in other embodiments.

In a block 906, the client can then join a non-accelerated channel such as high quality video channel 306 and high quality audio channel 308. In one embodiment, the non-accelerated channels that the client joins are preselected using the above-described preselected channel layout. In other embodiments, the client joins channel(s) based on the presentation description information contained in announcement stream. In a block 908, the client quits the acceleration channel. In one embodiment, the client quits the acceleration channel immediately after receiving the unit or units of multimedia data needed to begin the rendering/playback process or processes.

Although blocks 902 through 908 are described as being performed sequentially, in the flow chart of FIG. 9 (as well as the other flow charts described herein) the blocks may be performed in orders different from that shown, or with some blocks being performed more than once or with some blocks being performed concurrently or a combination thereof. For example, in some embodiments, blocks 902 and 906 are performed in parallel so that the operational flow is that the client joins accelerated and non-accelerated channels concurrently. Block 904 is performed sequentially after block 902, with block 904 and 906 proceeding to block 908.

Figure 9A:
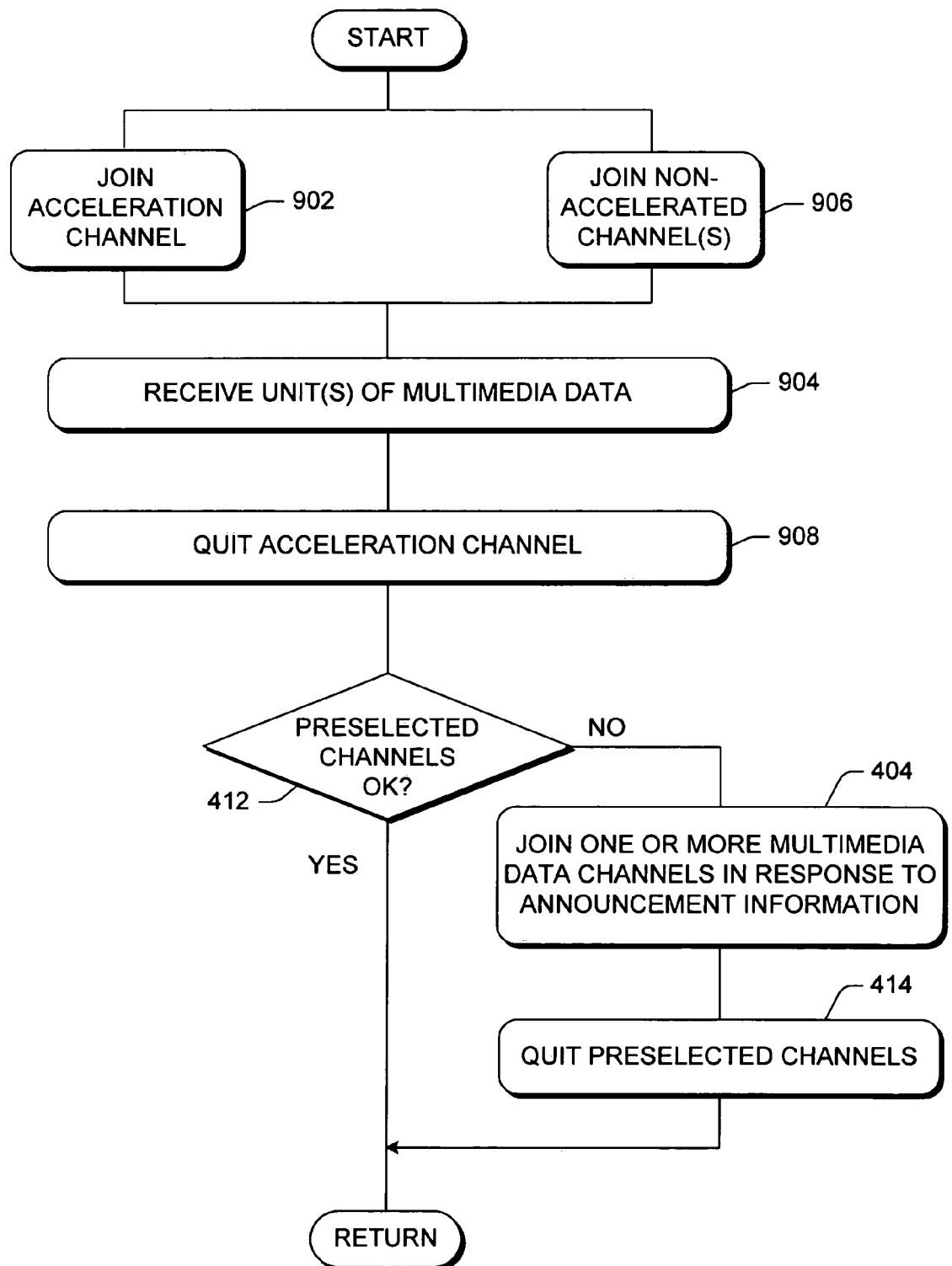
FIG. 9A is a flow diagram illustrating client operational flow in receiving an accelerated stream, according to another embodiment.

FIG. 9A illustrates an example scenario in which a client may join the acceleration channel and some preselected channels, and then join other channels (e.g., based on announcement information received from the announcement channel). In this example, the client joins the acceleration channel (i.e., block 902) concurrently with joining one or more preselected non-accelerated channels (i.e., block 906). Then the client receives one or more units of multimedia data from the acceleration channel (i.e., block 904) as well as multimedia and announcement data from the non-accelerated channel(s). As a result of joining the announcement channel, the client may decide to quit the preselected channel(s) and join other non-accelerated channels (i.e., blocks 412, 404 and 414).

The various multicasting embodiments described above may be implemented in computer environments of the server and clients. An example computer environment suitable for use in the server and clients is described below in conjunction with FIG. 10.

Figure 10:
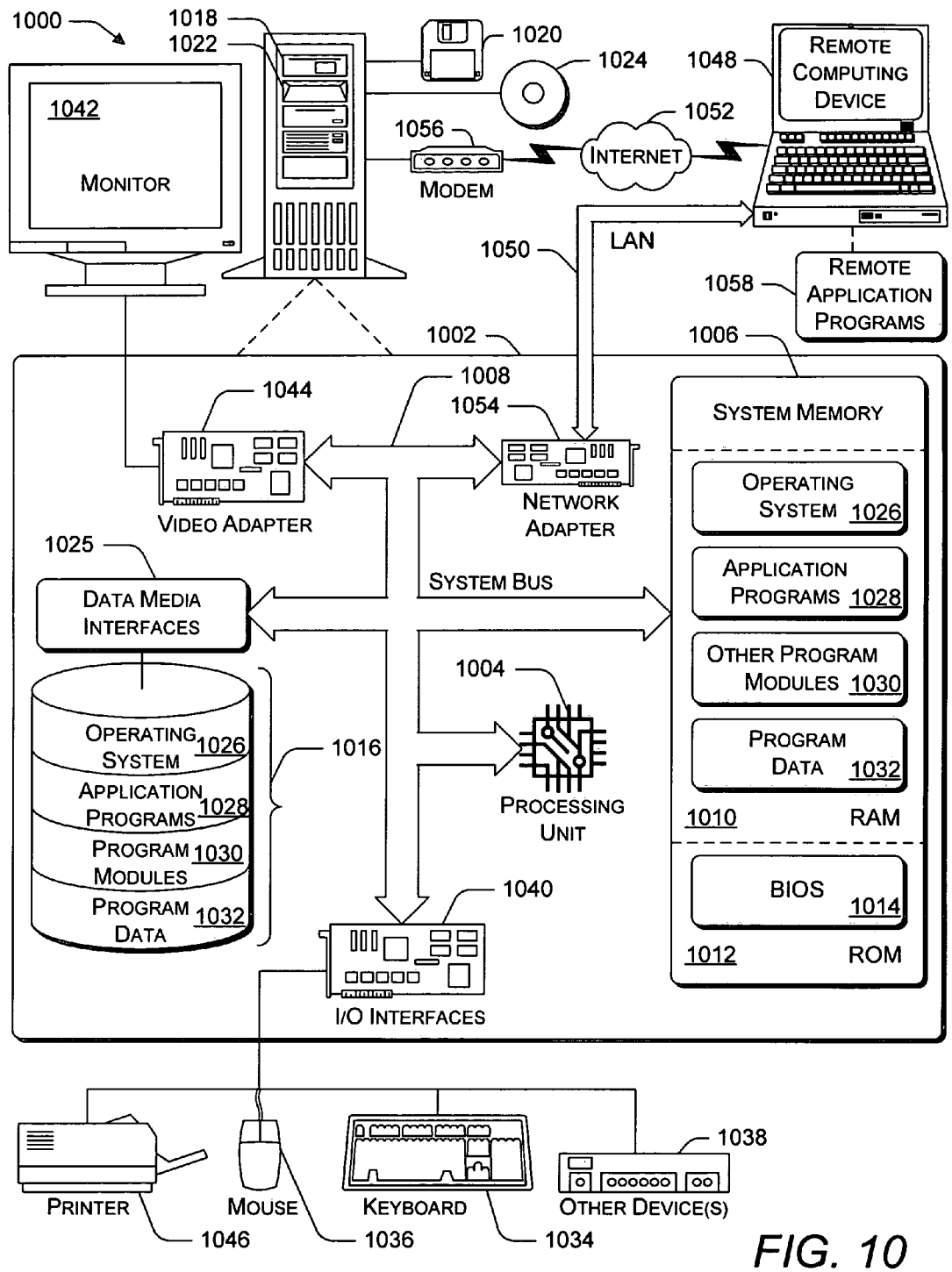
FIG. 10 is a block diagram illustrating an example computing environment suitable for practicing the above embodiments.

FIG. 10 illustrates a general computer environment 1000, which can be used to implement the techniques described herein. The computer environment 1000 is only one example of a computing environment and is not intended to suggest any limitation as to the scope of use or functionality of the computer and network architectures. Neither should the computer environment 1000 be interpreted as having any dependency or requirement relating to any one or combination of components illustrated in the example computer environment 1000.

Computer environment 1000 includes a general-purpose computing device in the form of a computer 1002. The components of computer 1002 can include, but are not limited to, one or more processors or processing units 1004, system memory 1006, and system bus 1008 that couples various system components including processor 1004 to system memory 1006.

System bus 1008 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 1002 may include a variety of computer readable media. Such media can be any available media that is accessible by computer 1002 and includes both volatile and non-volatile media, removable and non-removable media.

System memory 1006 includes computer readable media in the form of volatile memory, such as random access memory (RAM) 1010; and/or non-volatile memory, such as read only memory (ROM) 1012 or flash RAM. Basic input/output system (BIOS) 1014, containing the basic routines that help to transfer information between elements within computer 1002, such as during start-up, is stored in ROM 1012 or flash RAM. RAM 1010 typically contains data and/or program modules that are immediately accessible to and/or presently operated on by processing unit 1004.

Computer 1002 may also include other removable/non-removable, volatile/non-volatile computer storage media. By way of example, FIG. 10 illustrates hard disk drive 1016 for reading from and writing to a non-removable, non-volatile magnetic media (not shown), magnetic disk drive 1018 for reading from and writing to removable, non-volatile magnetic disk 1020 (e.g., a "floppy disk"), and optical disk drive 1022 for reading from and/or writing to a removable, non-volatile optical disk 1024 such as a CD-ROM, DVD-ROM, or other optical media. Hard disk drive 1016, magnetic disk drive 1018, and optical disk drive 1022 are each connected to system bus 1008 by one or more data media interfaces 1025. Alternatively, hard disk drive 1016, magnetic disk drive 1018, and optical disk drive 1022 can be connected to the system bus 1008 by one or more interfaces (not shown).

The disk drives and their associated computer-readable media provide non-volatile storage of computer readable instructions, data structures, program modules, and other data for computer 1002. Although the example illustrates a hard disk 1016, removable magnetic disk 1020, and removable optical disk 1024, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1016, magnetic disk 1020, optical disk 1024, ROM 1012, and/or RAM 1010, including by way of example, operating system 1026, one or more application programs 1028, other program modules 1030, and program data 1032. Each of such operating system 1026, one or more application programs 1028, other program modules 1030, and program data 1032 (or some combination thereof) may implement all or part of the resident components that support the distributed file system.

A user can enter commands and information into computer 1002 via input devices such as keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to processing unit 1004 via input/output interfaces 1040 that are coupled to system bus 1008, but may be connected by other interface and bus structures, such as a parallel port, game port, or a universal serial bus (USB).

Monitor 1042 or other type of display device can also be connected to the system bus 1008 via an interface, such as video adapter 1044. In addition to monitor 1042, other output peripheral devices can include components such as speakers (not shown) and printer 1046, which can be connected to computer 1002 via I/O interfaces 1040.

Computer 1002 can operate in a networked environment using logical connections to one or more remote computers, such as remote computing device 1048. By way of example, remote computing device 1048 can be a PC, portable computer, a server, a router, a network computer, a peer device or other common network node, and the like. Remote computing device 1048 is illustrated as a portable computer that can include many or all of the elements and features described herein relative to computer 1002. Alternatively, computer 1002 can operate in a non-networked environment as well.

Logical connections between computer 1002 and remote computer 1048 are depicted as a local area network (LAN) 1050 and a general wide area network (WAN) 1052. Such networking environments are commonplace in offices, enterprise-wide computer networks, intranets, and the Internet.

When implemented in a LAN networking environment, computer 1002 is connected to local network 1050 via network interface or adapter 1054. When implemented in a WAN networking environment, computer 1002 typically includes modem 1056 or other means for establishing communications over wide network 1052. Modem 1056, which can be internal or external to computer 1002, can be connected to system bus 1008 via I/O interfaces 1040 or other appropriate mechanisms. It is to be appreciated that the illustrated network connections are examples and that other means of establishing at least one communication link between computers 1002 and 1048 can be employed.

In a networked environment, such as that illustrated with computing environment 1000, program modules depicted relative to computer 1002, or portions thereof, may be stored in a remote memory storage device. By way of example, remote application programs 1058 reside on a memory device of remote computer 1048. For purposes of illustration, applications or programs and other executable program components such as the operating system are illustrated herein as discrete blocks, although it is recognized that such programs and components reside at various times in different storage components of computing device 1002, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures or program modules but excludes wireless media. Communication media also includes any information delivery media. As a non-limiting example only, communication media includes wired media such as a wired network or direct-wired connection. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method, comprising:
  receiving, by a server, data of a multimedia presentation, wherein the data includes a first plurality of streams;
  multicasting, by a server, a second plurality of streams that includes a dedicated announcement stream and a first stream selected from the first plurality of streams, the announcement stream being multicast on a dedicated announcement channel and includes presentation description information of the multimedia presentation, and the selecting a first stream from the first plurality of streams being based at least in part on a comparison between the presentation description information and multimedia resources of a client to determine an appropriate channel to receive the selected first stream; and
  mapping, by a server, the announcement stream and the first stream selected from the first plurality of streams to a plurality of channels described in the presentation description information.

2. The method of claim 1, wherein the second plurality of streams are multicast on different channels.

3. The method of claim 2, wherein the second plurality of streams is multicast on predetermined different channels.

4. The method of claim 3, wherein the predetermined different channels comprise predetermined logical addresses.

5. The method of claim 4, wherein the predetermined logical addresses are predetermined internet protocol (IP) addresses with predetermined ports.

6. The method of claim 3, wherein the predetermined different channels comprise predetermined ports of a logical address.

7. The method of claim 1, wherein the second plurality of streams further comprises a second stream that includes a plurality of units of data of the multimedia presentation, the plurality of units each comprising a preselected number of previous subunits of data of the multimedia presentation.

8. The method of claim 7, wherein each unit of the plurality of units includes a key frame.

9. The method of claim 1, wherein the second plurality of streams further comprises multiple streams of video data having different bit rates.

10. the method of claim 1, wherein the second plurality of streams further comprises multiple streams of audio data having different bit rates.

11. The method of claim 1, wherein the second plurality of streams further comprises multiple streams. of multimedia data in different languages.

12. The method of claim 1, wherein the second plurality of streams further comprises a stream of data to be used by an application running on a client receiving the second plurality of streams.

13. The method of claim 1, wherein the announcement stream includes error correction information.

14. The method of claim 1, wherein the announcement stream includes security information.

15. The method of claim 1, wherein the announcement stream is multicast on an out-of-band channel.

16. The method of claim 1, wherein the announcement stream is multicast on an in-band channel.

17. The method of claim 16, wherein the announcement stream is multicast to conform to a real-time transport control protocol (RTCP), the announcement stream is interspersed in-band within a stream of multimedia presentation data that are multicast to conform to a real-time transport protocol (RTP).

18. The method of claim 16, wherein the announcement stream is multicast so that announcement stream data is included in a packet containing multimedia presentation data.

19. The method of claim 1, further comprising configuring a server to support an announcement channel, a high quality video channel, a high quality audio channel, an application channel, one or more alternative language channels, and one or more alternative bit rate channels.

20. A computer-readable medium storing computer-executable instructions to perform operations, comprising:
receiving data of a multimedia presentation, wherein the data includes a first plurality of streams;
multicasting a second plurality of streams that includes a dedicated announcement stream and a first stream selected from the first plurality of streams, the announcement stream being multicast on a dedicated announcement channel and includes presentation description information of the multimedia presentation, and the selecting a first stream from the first plurality of streams being based at least in part on a comparison between the presentation description information and multimedia resources of a client to determine an appropriate channel to receive the selected first stream; and
map the announcement stream and the first stream selected from the plurality of first streams to a plurality of channels described in the presentation description information.

21. The computer-readable medium of claim 20, wherein the second plurality of streams are multicast on different channels.

22. The computer-readable medium of claim 21, wherein the second plurality of streams is multicast on predetermined different channels.

23. The computer-readable medium of claim 22, wherein the predetermined different channels comprise predetermined logical addresses.

24. The computer-readable medium of claim 23, wherein the predetermined logical addresses are predetermined Internet protocol (IP) addresses with predetermined ports.

25. The computer-readable medium of claim 22, wherein the predetermined different channels comprise predetermined ports of a logical address.

26. The computer-readable medium of claim 20, wherein the second plurality of streams further comprises a second stream that includes a plurality of units of data of the multimedia presentation, the plurality of units each comprising a preselected number of previous subunits of data of the multimedia presentation.

27. The computer-readable medium of claim 26, wherein each unit of the plurality of units includes a key frame.

28. The computer-readable medium of claim 20, wherein the second plurality of streams further comprises multiple streams of video data having different bit rates.

29. The computer-readable medium of claim 20, wherein the second plurality of streams further comprises multiple streams of audio data having different bit rates.

30. The computer-readable medium of claim 20, wherein the second plurality of streams further comprises multiple streams of multimedia data in different languages.

31. The computer-readable medium of claim 20, wherein the second plurality of streams further comprises a stream of data to be used by an application running on a client receiving the second plurality of streams.

32. The computer-readable medium of claim 20, wherein announcement stream includes error correction information.

33. The computer-readable medium of claim 20, wherein announcement stream includes security information.

34. A computer-readable medium storing computer-executable instructions to perform operations comprising:
receiving data of a multimedia presentation, wherein the data includes a first plurality of streams;
multicasting a second plurality of streams that includes a first stream selected from the first plurality of streams and a second stream that includes a plurality of units of data of the multimedia presentation, the plurality of units each comprising a preselected number of previous subunits of data of the multimedia presentation; and
mapping a dedicated announcement stream, that presents description information of the multimedia presentation, the first stream selected from the first plurality of streams, and the second stream to a plurality of channels, the description information of the multimedia presentation being used by a client to determine whether at least one of the plurality of channels is appropriate for the selected first stream based on multimedia resources of the client.

35. The computer-readable medium of claim 34, wherein each unit of the plurality of units includes a key frame.

36. The computer-readable medium of claim 34, wherein the plurality of units of the second stream each includes enough data to reduce the amount of time needed by a multimedia player to begin playback of the multimedia presentation.

37. A method, comprising:
receiving, by a server, data of a multimedia presentation, wherein the data includes a first plurality of streams;
multicasting, by the server, a second plurality of streams that includes a first stream selected from the first plurality of streams and a second stream that includes a plurality of units of data of the multimedia presentation, the plurality of units each comprising a preselected number of previous subunits of data of the multimedia presentation; and
mapping, by the server, a dedicated announcement stream, that presents description information of the multimedia presentation, the first stream selected from the first plurality of streams, and the second stream to a plurality of channels, the description information of the multimedia presentation being used by a client to determine whether at least one of the plurality of channels is appropriate for the selected first stream based on multimedia resources of the client.

38. The method of claim 37, wherein each unit of the plurality of units includes a key frame.

39. The method of claim 37, wherein the plurality of units of the second stream each includes enough data to reduce the amount of time needed by a multimedia player to begin playback of the multimedia presentation.

40. A method, comprising:
receiving, by a server, data of a multimedia presentation, wherein the data includes a first plurality of streams;
multicasting, by the server, a second plurality of streams that includes first and second streams related to information contained in the first plurality of streams, wherein the first and second streams are multicast in preselected channels;
wherein the multicasting a second plurality of streams includes selecting a first stream from the first plurality of streams, the selecting a first stream being based at least in part on a comparison between presentation description information included in a dedicated announcement stream and multimedia resources of a client to determine an appropriate channel to receive the selected first stream; and
mapping, by the server, the dedicated announcement stream, the first stream selected from the first plurality of streams, and the second stream to a plurality of channels.

41. The method of claim 40, wherein the predetermined different channels comprise predetermined logical addresses.

42. The method of claim 40, wherein the predetermined different channels comprise predetermined ports of an Internet protocol (IP) address.

43. The method of claim 40, wherein the first stream is the announcement stream containing presentation description information.

44. A computer-readable medium having computer-executable instructions to perform operations comprising:
receiving data of a multimedia presentation, wherein the data includes a first plurality of streams;
multicasting a second plurality of streams that includes first and second streams related to information contained in the first plurality of streams, wherein the first and second streams are multicast in preselected channels, wherein the multicasting a second plurality of streams includes selecting a first stream from the first plurality of streams, the selecting a first stream being based at least in part on a comparison between presentation description information included in a dedicated announcement stream and multimedia resources of a client to determine an appropriate channel to receive the selected first stream; and
mapping the dedicated announcement stream, the first stream selected from the first plurality of streams, and the second stream to a plurality of channels.

45. The computer-readable medium of claim 44, wherein the predetermined different channels comprise predetermined logical addresses.

46. The computer-readable medium of claim 45, wherein the predetermined logical addresses are predetermined Internet protocol (IP) addresses with predetermined ports.

47. The computer-readable medium of claim 45, wherein the first stream is the announcement stream containing presentation description information.

48. The computer-readable medium of claim 44, wherein the predetermined different channels comprise predetermined ports of a logical address.

49. A method, comprising:
receiving, by a client computing device, a first stream from a preselected first channel, wherein the first stream comprises presentation description information related to a multimedia presentation being multicast;
receiving, by a client computing device, a second stream on a second preselected channel concurrently with receiving the first stream on the preselected first channel, wherein the second stream comprises a stream of multimedia data of the multimedia presentation being multicast, the second stream being selected based on a comparison between the received presentation description information and multimedia resources of the client; and
mapping, by a server, the first stream from the preselected first channel and the second stream from the second preselected channel to a plurality of channels.

50. The method of claim 49, further comprising:
terminating reception of the second stream; and
selectively receiving a third stream on a third channel selected in response to receiving presentation description information from the first stream, wherein the third stream comprises another stream of multimedia data of the multimedia presentation being multicast.

51. The method of claim 49, further comprising continuing to receive the second stream in response to receiving presentation description information from the first stream indicating that the second stream meets preselected criteria.

52. A computer-readable medium storing computer-executable instructions that when executed, cause one or more processors to perform operations, comprising:
receiving a first stream from a preselected first channel, wherein the first stream comprises presentation description information related to a multimedia presentation being multicast;
receiving a second stream on a second preselected channel concurrently with receiving the first stream on the preselected first channel, wherein the second stream comprises a stream of multimedia data of the multimedia presentation being multicast, the second stream being selected based on a comparison between the received presentation description information and multimedia resources of a client; and
mapping the first stream from the preselected first channel and the second stream from the second preselected channel to a plurality of channels.

53. The computer-readable medium of claim 52, wherein the operations further comprise:
    terminating reception of the second stream; and
    selectively receiving a third stream on a third channel selected in response to receiving presentation description information from the first stream, wherein the third stream comprises another stream of multimedia data of the multimedia presentation being multicast.

54. The computer-readable medium of claim 52, wherein the operations further comprise:
    continuing to receive the second stream in response to presentation receiving description information from the first stream indicating that the second stream meets preselected criteria.

55. A method, comprising: receiving, by a client computing device, a unit of data from a preselected first channel, wherein the first channel transports a plurality of units of data of a multimedia presentation being multicast, wherein the plurality of units each comprise a preselected number of previous subunits of data of the multimedia presentation being multicast;
    terminating, by the client computing device, reception of data from the first preselected channel;
    receiving, by a client computing device, a second stream on a second channel, wherein the second stream comprises a stream of multimedia of the multimedia presentation being multicast; and
    mapping, by a server, at least one of the plurality of units of data and the second stream to a plurality of channels.

56. The method of claim 55, wherein the second channel is selected in response to presentation description information received from an announcement channel.

57. The method of claim 55, wherein the second channel is preselected.

58. A computer-readable medium storing computer-executable instructions that, when executed, cause one or more processors to perform operations comprising:
    receiving a unit of data from a preselected first channel, wherein the first channel transports a plurality of units of data of a multimedia presentation being multicast, wherein the plurality of units each comprise a preselected number of previous subunits of data of the multimedia presentation being multicast;
    terminating reception of data from the first preselected channel;
    receiving a second stream on a second channel, wherein the second stream comprises a stream of multimedia of the multimedia presentation being multicast; and
    mapping at least one of the plurality of units of data and the second stream to a plurality of channels.

59. The computer-readable medium of claim 58, wherein the second channel is selected in response to receiving presentation description information from an announcement channel.

60. The computer-readable medium of claim 58, wherein the operations further comprise preselecting the second channel.

61. A system, comprising:
    a first interface to receive a first plurality of streams of a multimedia presentation;
    an announcement generator to provide an announcement stream containing presentation description information regarding the multimedia presentation;
    a mapper to map the announcement stream and a first stream selected from the first plurality of streams to a plurality of channels, the first stream being selected based on a comparison between the presentation description information and multimedia resources of a client;
    a second interface to multicast a second plurality of streams over a network, wherein the second plurality of streams comprises the mapped announcement stream and the mapped first stream; and
    a physical device that multicasts the second plurality of streams over the network.

62. The system of claim 61, wherein the second plurality of streams is multicast on predetermined different channels.

63. The system of claim 62, wherein the predetermined different channels comprise predetermined logical addresses.

64. The system of claim 63, wherein the predetermined logical addresses each comprise an Internet protocol (IP) address and a port.

65. The system of claim 62, wherein the predetermined different channels comprise predetermined ports of a logical address.

66. The system of claim 62, wherein the second plurality of streams further comprises a second stream that when multicast includes a plurality of units of data of the multimedia presentation, the plurality of units each comprising a preselected number of previous subunits of data of the multimedia presentation.

67. The system of claim 66, wherein the second stream includes a key frame.

68. The system of claim 62, wherein the second plurality of streams further comprises streams of video data having different bit rates selected from the first plurality of streams.

69. The system of claim 62, wherein the second plurality of streams further comprises multiple streams of audio data having different bit rates selected from the first plurality of streams.

70. The system of claim 62, wherein the second plurality of streams further comprises multiple streams of multimedia data in different languages selected from the first plurality of streams.

71. The system of claim 62, wherein the second plurality of streams further comprises a stream of data to be used by an application running on a client receiving the second plurality of streams.

72. The system of claim 62, wherein the announcement stream includes error correction information.

73. The system of claim 62, wherein the announcement stream includes security information.

74. The system of claim 62, wherein the announcement stream is multicast on an out-of-band channel.

75. The system of claim 62, wherein the announcement stream is multicast on an in-band channel.

76. The system of claim 75, wherein the announcement stream is multicast to conform to a real-time transport control protocol (RTCP), the announcement stream is interspersed in-band within a stream of multimedia presentation data that are multicast to conform to a real-time transport protocol (RTP).

77. The system of claim 75, wherein the announcement stream is multicast so that announcement stream data is included in a packet containing multimedia presentation data.

78. A computer-readable medium containing components as recited in claim 62.

79. A system, comprising:
    means for receiving a first plurality of streams of a multimedia presentation;
    means for generating an announcement stream containing presentation description information regarding the multimedia presentation;

means for mapping the announcement stream and a first stream selected from the first plurality of streams to one or more channels of a plurality of channels, the first stream being selected based on a comparison between the presentation description information and multimedia resources of a client;

means for multicasting a second plurality of streams over a network, wherein the second plurality of streams comprises the mapped announcement and first streams; and means for multicasting the second plurality of streams from a physical device.

80. The system of claim 79, wherein the second plurality of streams is multicast on predetermined different channels.

81. The system of claim 80, further comprising:

means for providing a plurality of units of data of the multimedia presentation to the means for mapping, the plurality of units of data to be multicast as part of the second plurality of streams, wherein the plurality of units when multicast each comprises a preselected number of previous subunits of data of the multimedia presentation.

82. A computer-readable medium containing components as recited in claim 79.

* * * * *